(12) United States Patent
Lee et al.

(10) Patent No.: US 7,484,874 B2
(45) Date of Patent: Feb. 3, 2009

(54) OPTICAL SHEET AND BACKLIGHT UNIT HAVING THE SAME

(75) Inventors: ManHoan Lee, Gumi-si (KR);
Sung-Keun Lee, Gumi-si (KR);
Changki Seo, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 90 days.

(21) Appl. No.: 11/300,438

(22) Filed: Dec. 15, 2005

(65) Prior Publication Data

US 2006/0209562 A1    Sep. 21, 2006

(30) Foreign Application Priority Data

Mar. 16, 2005    (KR) .................... 10-2005-0021655

(51) Int. Cl.
*F21V 7/04*    (2006.01)
(52) U.S. Cl. .................. 362/607; 362/330; 359/619
(58) Field of Classification Search ......... 362/606–609, 362/330, 224–225, 367, 613–614, 559–561; 359/599, 619; 349/64, 65
See application file for complete search history.

(56) References Cited

U.S. PATENT DOCUMENTS

| | | | | |
|---|---|---|---|---|
| 4,924,356 A | * | 5/1990 | French et al. | 362/607 |
| 6,104,854 A | * | 8/2000 | Masaki et al. | 385/133 |
| 6,280,063 B1 | * | 8/2001 | Fong et al. | 362/333 |
| 6,527,410 B2 | * | 3/2003 | Yamaguchi | 362/243 |

* cited by examiner

*Primary Examiner*—Bao Q Truong
(74) *Attorney, Agent, or Firm*—McKenna Long & Aldridge LLP

(57) ABSTRACT

An optical sheet and a backlight unit having the same are provided. The optical sheet includes a substrate, a lens array, and a diffuser film. The lens array includes a plurality of lenses arranged on an upper surface of the substrate and the diffuser film disposed on a lower surface of the substrate and including a plurality of protrusions. Each of the protrusions is arranged in a direction perpendicular to the direction of each of the lenses, so that a viewing angle characteristic is improved and brightness is enhanced.

9 Claims, 9 Drawing Sheets

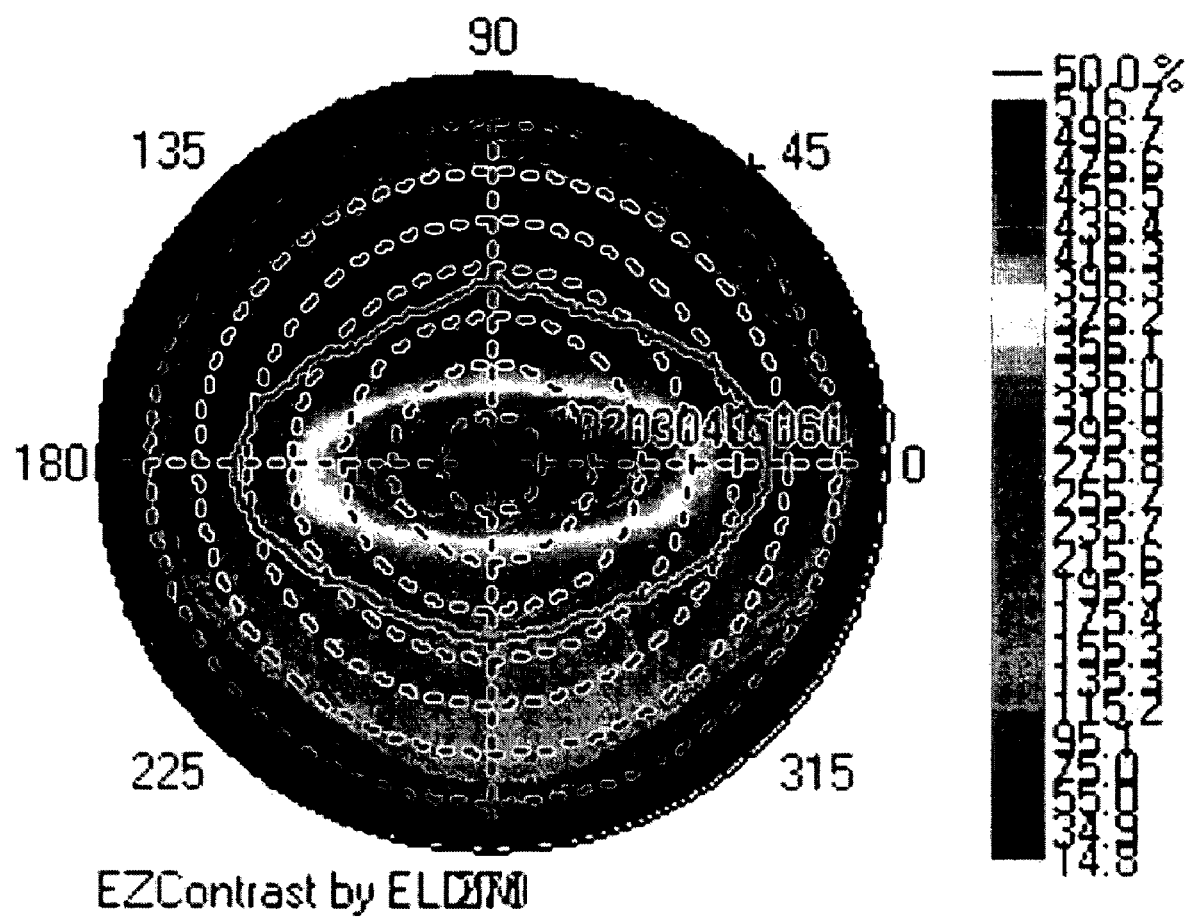

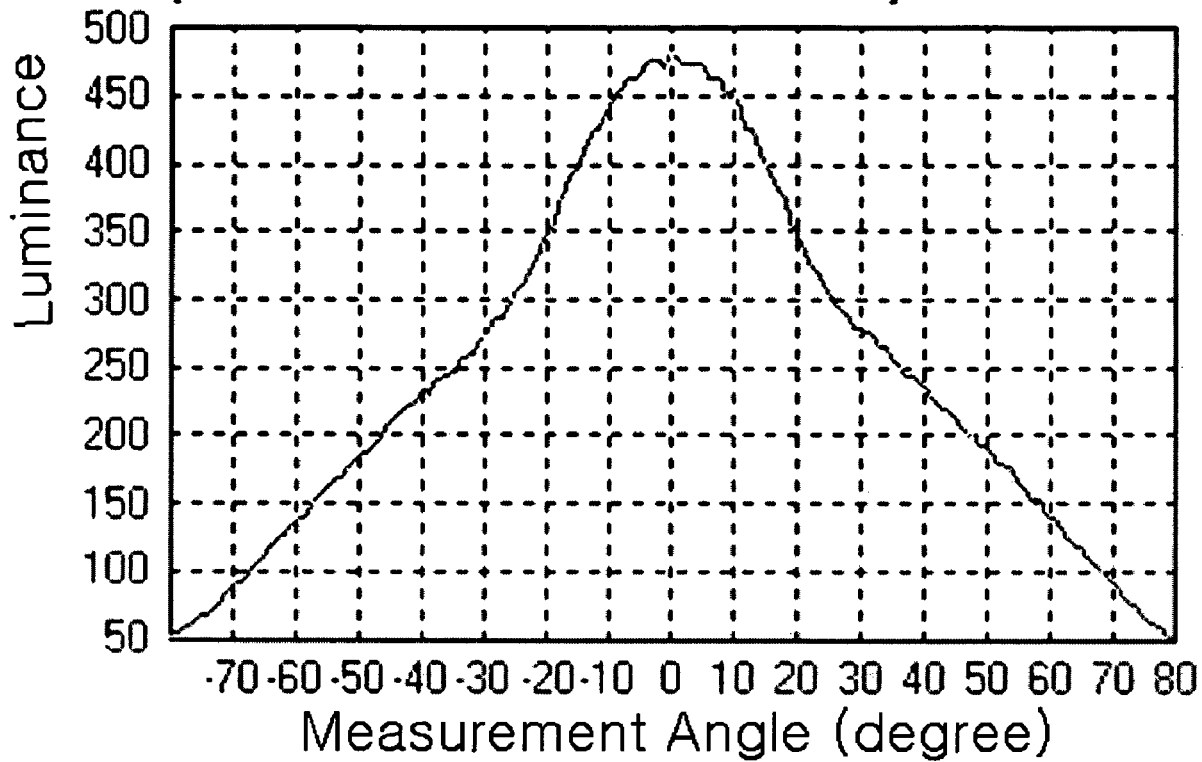

OPTICAL SHEET AND BACKLIGHT UNIT HAVING THE SAME

This application claims the benefit of Korean Application No. 021655/2005, filed on Mar. 16, 2005, which is incorporated by reference for all purposes as if fully set forth herein.

BACKGROUND OF THE INVENTION

1. Field of the Invention

The present invention relates to an optical sheet, and more particularly, to an optical sheet and a backlight unit having the same.

2. Discussion of the Related Art

Liquid crystal display devices (LCDs) display images by controlling pixels arranged in a matrix configuration to adjust the displacements of liquid crystal (LC) molecules and thus adjust light transmittance. Because the LCDs do not generate light by themselves, the LCDs receive light from an external light source, e.g., a backlight unit.

FIG. 1 is a view of a backlight unit of the related art LCD.

Referring to FIG. 1, the LCD includes: a lamp 10 disposed at a side of the LCD to generate light; a lamp housing 14 enclosing the lamp 10; a light guide plate 12 for changing light incident from a lateral direction from the lamp 10 into a surface light source; a reflector 16 disposed below the light guide plate 12 to reflect the light upward; a diffuser sheet 18 disposed above the light guide plate 12 to diffuse the light; a prism sheet 20 for controlling the direction of the light that has passed through the diffuser sheet 18; and a protection film 24 formed on the prism sheet 20.

An LC panel (not shown) is located on the backlight unit to realize an image by controlling the transmittance of the light emitted from the backlight unit.

The related art backlight unit illustrated in FIG. 1 is an edge-type backlight unit where the lamp 10 is disposed at the side of the backlight unit. In the case of a direct-type backlight unit where a plurality of lamps are arranged on the same plane, the light guide plate 12 may be omitted.

Cold cathode fluorescence lamps (CCFLS) typically are used for the lamp 10. Light generated by the lamp 10 is incident to the light guide plate 12 through an incident plane located on a lateral side of the light guide plate 12. A reflection surface on the inner surface of the lamp housing 14 reflects light from the lamp 10 toward the incident plane of the light guide plate 12.

The light guide plate 12 includes a light-emitting plane approximately parallel to an inclined bottom plane of the light guide plate 12. Also, the light guide plate is manufactured such that the incident plane is substantially perpendicular to the inclined bottom plane. The reflector 16 is installed on the bottom plane of the light guide plate 12 facing the bottom plane. The light guide plate 12 allows light incident from the lamp 10 to reach a place distant from the lamp 10. The light guide plate 12 is formed of polymethylmethacrylate (PMMA) with high strength that is not easily transformed or broken and having excellent transmittance.

The reflector 16 reduces light loss by reflecting light incident to below the light guide plate 12 in an upward direction. When light from the lamp 10 is incident to the light guide plate 12, the light is reflected with a predetermined inclination angle at the bottom-inclined plane to uniformly progress toward the light emitting plane. The light emitted from the light guide plate 12 by way of the light emitting plane, is diffused to the entire region of the LC panel by the diffuser sheet 18.

Light incident to the LC panel has a high light efficiency when the light is perpendicular to the surface of the LC panel. For that purpose, the prism sheet 20 is provided to allow the direction of the light from the light guide plate 12 to be substantially perpendicular to the LC panel.

The prism sheet 20 includes a plurality of prism rods each having a crest and a valley. The prism sheet 20 changes the diffused light emitted from the diffuser sheet 18 into light substantially perpendicular to the LC panel. The protection film 24 is disposed on the prism sheet 20 to protect the surface of the prism sheet 20 and to diffuse the light to achieve uniform distribution of light.

FIGS. 2A and 2B are a sectional view and a perspective view of the prism sheet illustrated in FIG. 1.

Referring to FIGS. 2A and 2B, the related art prism sheet 20 includes: a substrate 21 to which light diffused by the light guide plate and the diffuser sheet is initially incident; and a isosceles triangular prism-shaped protrusion 22 having a predetermined vertical angle $\alpha$, for allowing the diffused light to progress along a constant optical path. The protrusion 22 is arranged in a stripe shape on the substrate 21.

When a vertex 23 of the protrusion 220 receives light and faces the LC panel, the diffused light incident from the substrate 21 is refracted and gathered. However, when the light incident to an inclined plane 24 of the protrusion 22 is not emitted due to a total internal reflection, such light is lost, and does not contribute to brightness at the front of the LC panel.

To overcome this problem, the arrangement of the prism sheet may be changed such that the vertex faces the light guide plate so as to use the vertex 23 for an incident plane. In that case, the front brightness may be improved but a viewing angle becomes narrow, that is not appropriate for flat display devices that require a wide viewing angle such as a television for home use.

Also, two prism sheets may be used such that the arrangement directions of the protrusions 220 overlap and intersect each other. In that case, the number of parts and manufacturing costs of the LCD increase.

SUMMARY OF THE INVENTION

Accordingly, the present invention is directed to an optical sheet and a backlight unit having the same that substantially obviate one or more problems due to limitations and disadvantages of the related art.

An advantage of the present invention is to provide an optical sheet and a backlight unit having the same, capable of providing a wide viewing angle and improving brightness by providing a semicircular lens array sheet replacing a prism sheet and forming a diffuser film having a plurality of protrusions arranged in a direction perpendicular to the arrangement direction of the semicircular lens array sheet below the semicircular lens array sheet.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, there is provided an optical sheet including: a substrate; a lens array having a plurality of elongated lenses arranged on an upper surface of the substrate; and a diffuser film on a lower surface of the substrate and having a plurality of protrusions, each of the protrusions being arranged in a direction perpendicular to the direction of each of the lenses.

In another aspect of the present invention, there is provided a backlight unit including: a lamp disposed on a lateral side; a light guide plate disposed in the same plane as that of the lamp to change light from the lamp into a surface light source; and an optical sheet disposed on an upper surface of the light guide plate to compensate a viewing angle of the light, wherein the optical sheet includes: a substrate; a lens array having a plurality of elongated lenses arranged on an upper surface of the substrate; and a diffuser film on a lower surface of the substrate and having a plurality of protrusions, wherein each of the protrusions is arranged in a direction perpendicular to the direction of each of the lenses.

In a further another aspect of the present invention, there is provided a backlight unit including: a plurality of lamps arranged in the same plane; and an optical sheet disposed on the lamps to compensate a viewing angle of the light, wherein the optical sheet includes: a substrate; a lens array having a plurality of elongated lenses arranged on an upper surface of the substrate; and a diffuser film on a lower surface of the substrate and having a plurality of protrusions, wherein each of the protrusions is arranged in a direction perpendicular to the direction of each of the lenses.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A through 4C are views illustrating the viewing angle characteristics of the white light illustrated in FIG. 3;

DETAILED DESCRIPTION OF THE ILLUSTRATED EMBODIMENTS

Reference will now be made in detail to an embodiment of the present invention, examples of which are illustrated in the accompanying drawings.

As described above, to overcome the problems of the related art prism sheet of a backlight unit of an LCD, a semicircular lens array sheet is used instead of the prism sheet.

Figure 1:
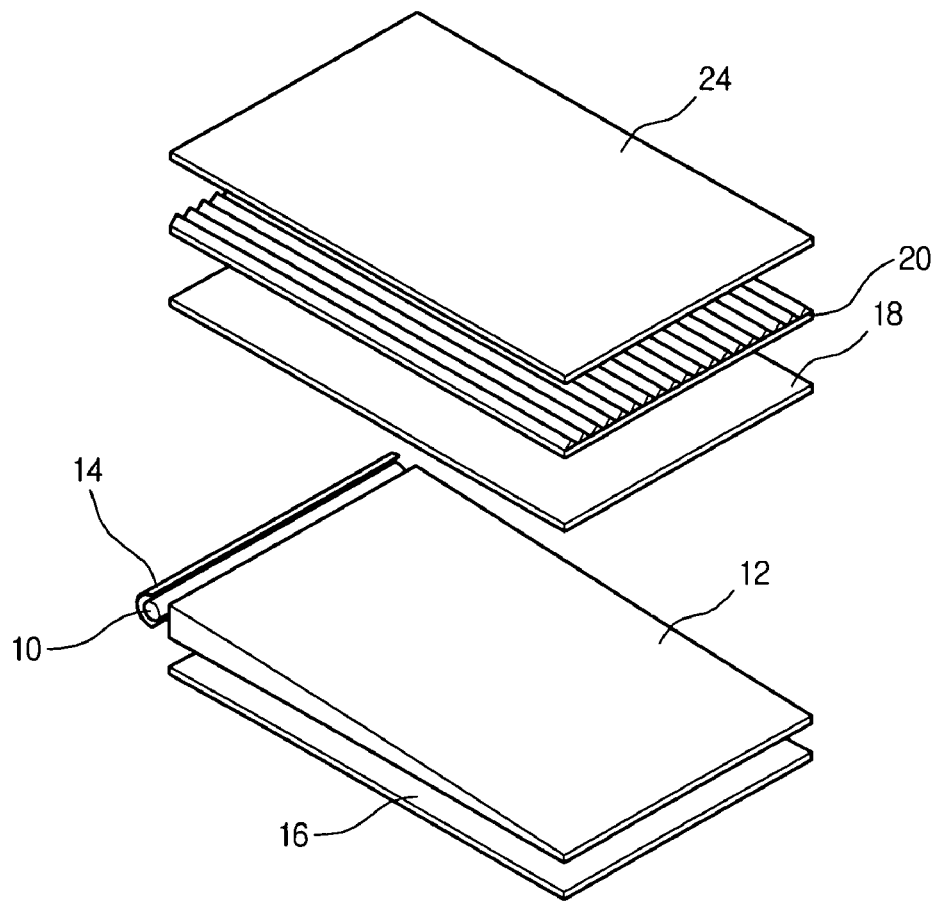
FIG. 1 is a view illustrating a backlight unit of the related art LCD.
Figure 2A:
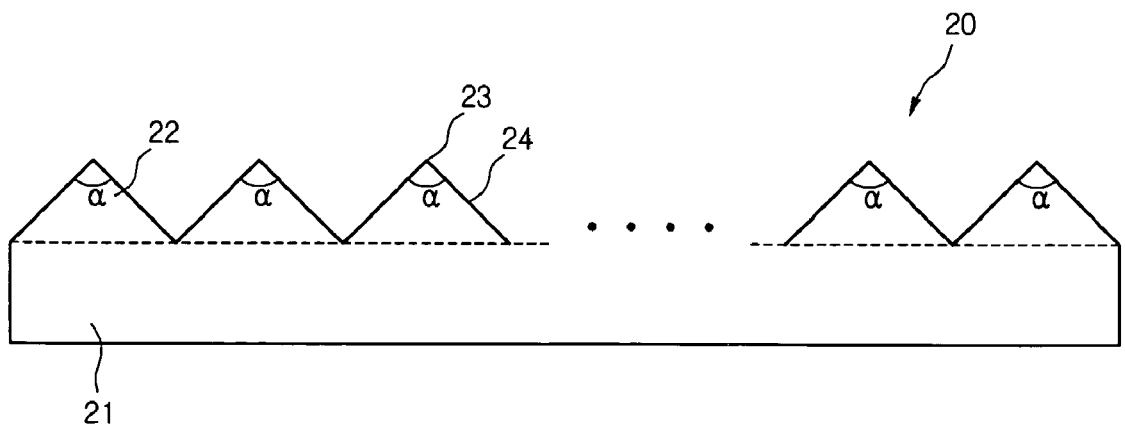
FIGS. 2A and 2B are a sectional view and a perspective view of the prism sheet illustrated in FIG. 1.
Figure 2B:
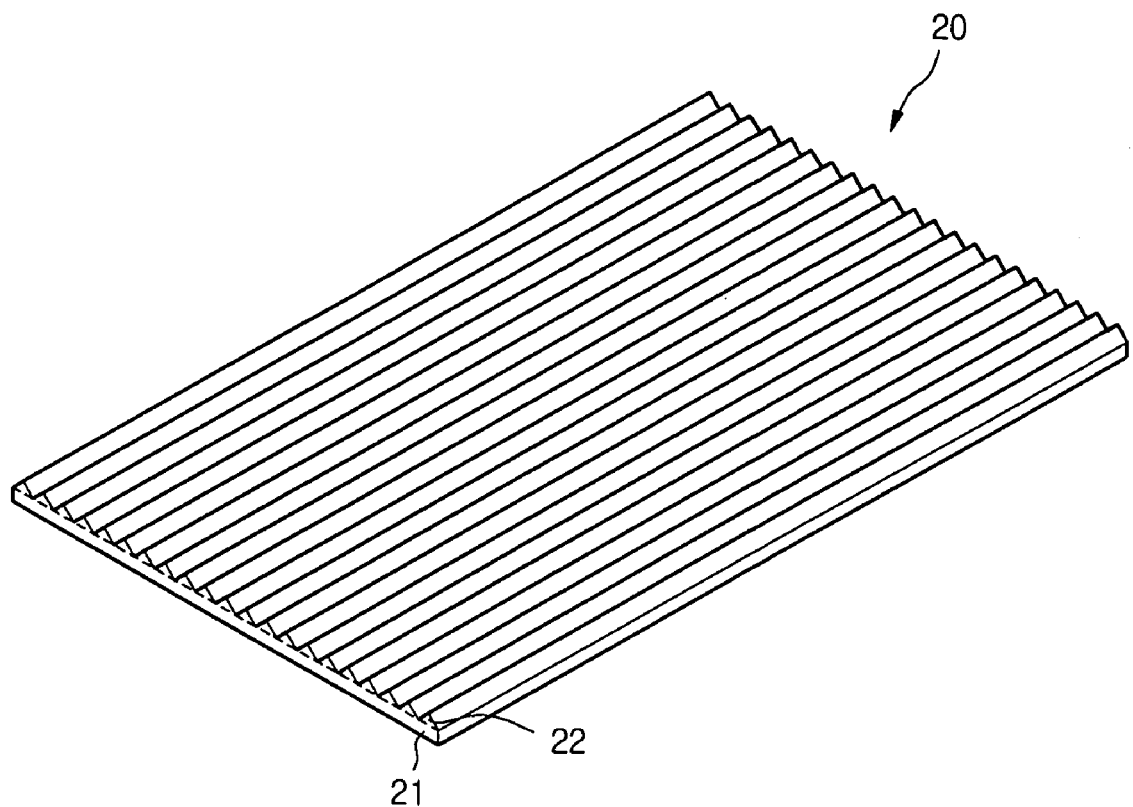
Figure 3A:
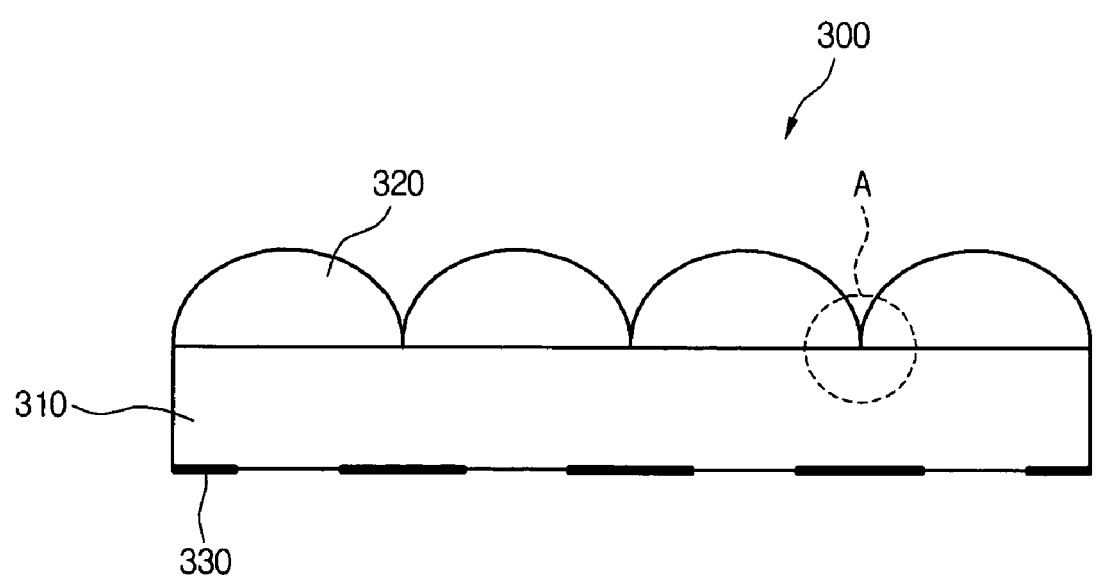
FIGS. 3A and 3B are a sectional view and a perspective view of a semicircular lens array sheet provided to a backlight unit of an LCD.
Figure 3B:
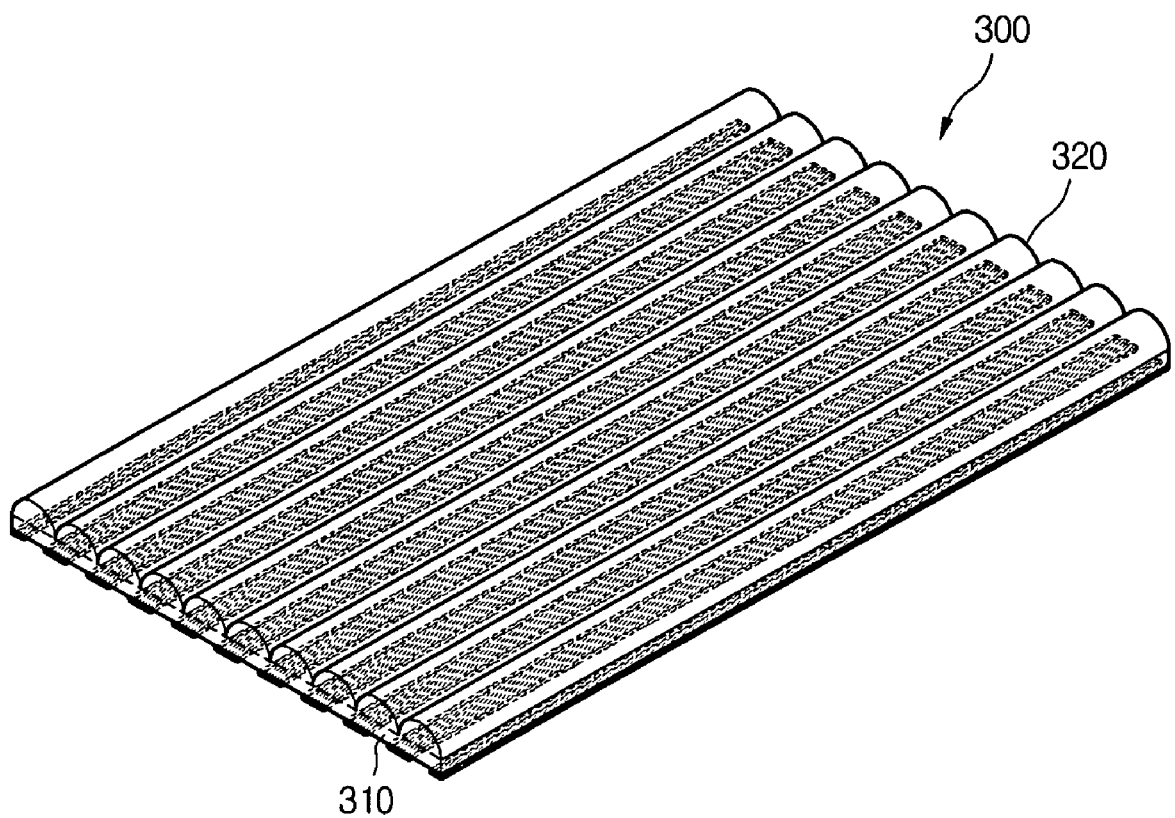

FIGS. 3A and 3B are a sectional view and a perspective view of a semicircular lens array sheet provided to a backlight unit of an LCD.

Referring to FIGS. 3A and 3B, the semicircular lens array sheet 300 includes: a substrate 310 to which light diffused by a light guide plate and/or a diffuser sheet is initially incident; a semicircular lens array 320 for allowing the diffused light to progress along a constant optical path; and a reflection pattern 330 formed on the lower portion of the substrate 310 that corresponds to a valley A to prevent light from being incident to the valley A (i.e., the region where the semicircular lenses contact each other). The semicircular lens array 320 is disposed in a stripe shape. The reflection pattern 330 prevents sidelobes in a light pattern generated when light passes through the diffuser sheet.

The semicircular lens array sheet 300 changes incident light into parallel light by the semicircular lens array 320 to overcome the problems in the related art prism sheet. That is, the problem where light incident to the inclined plane of the prism sheet is lost, due to the total internal reflection, is solved.

However, because the semicircular lens array sheet 300 is formed in a stripe shape, the viewing angle of light is asymmetric, i.e., the viewing angle profiles along perpendicular directions are different.

Figure 4C:
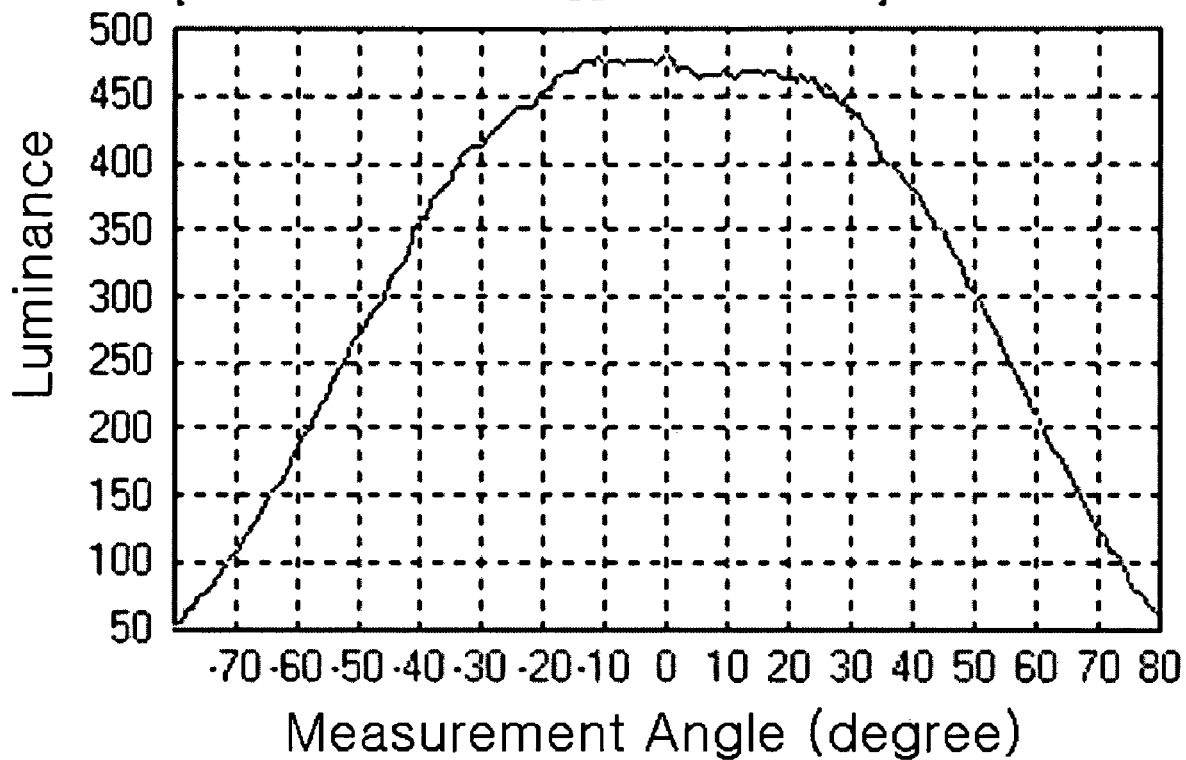

FIGS. 4A through 4C are views illustrating the viewing angle characteristics of white light emitted by the LCD backlight unit illustrated in FIG. 3.

FIG. 4A is a diagram illustrating an overall viewing angle distribution of white light transmitted by semicircular lens array sheet, FIG. 4B is a graph illustrating the vertical viewing angel characteristics of white light transmitted by the semicircular lens array sheet, and FIG. 4C is a graph illustrating the horizontal viewing angel characteristics of white light transmitted by the semicircular lens array sheet. Here, a vertical direction is the vertical direction of the semicircular lens array sheet 300, and a horizontal direction is the horizontal direction of the semicircular lens array sheet 300.

Referring to FIGS. 4A through 4C, the semicircular lens array sheet illustrated in FIG. 3 has a vertical viewing angle narrower than a horizontal viewing angle.

Because the viewing angle profiles of light that has passed through the semicircular lens array sheet 300 are asymmetric vertically and horizontally, the symmetry of the viewing angle is destroyed. Such asymmetry of the viewing angle of the backlight unit has an influence on the viewing angle of the LC panel, so that the viewing angle of the LC panel becomes narrow as well.

To overcome such problems, a diffuser film including a plurality of protrusions arranged in a direction perpendicular to direction of the semicircular lens array is provided on the lower surface of the semicircular lens array sheet, so that the asymmetry in the viewing angle of the backlight unit is overcome.

Figure 5A:
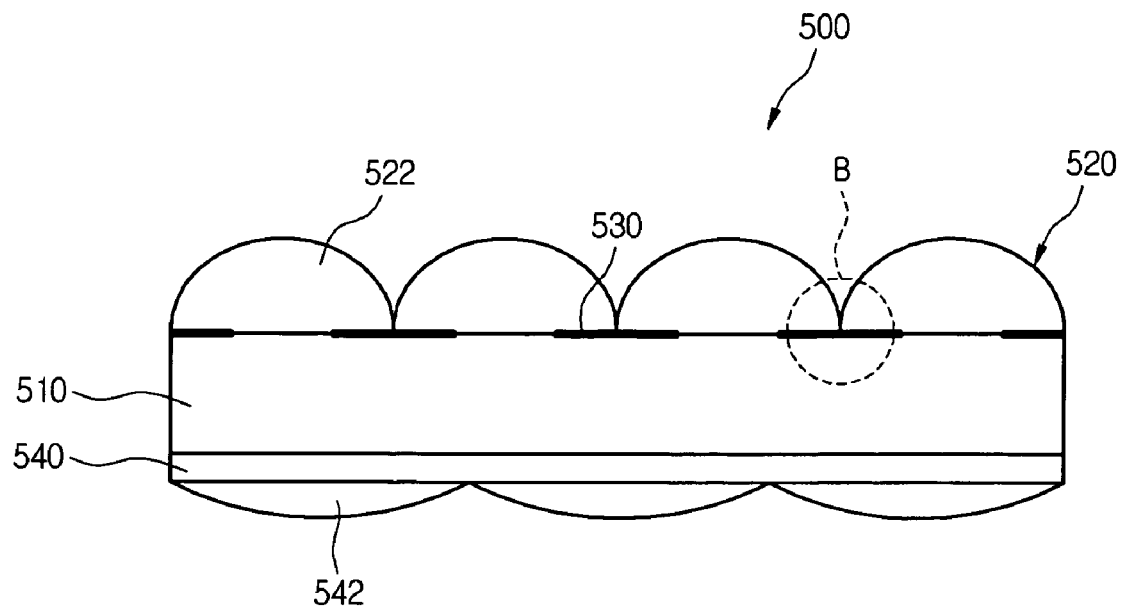
FIGS. 5A and 5B are a sectional view and a perspective view of a semicircular lens array sheet according to an embodiment of the present invention.
Figure 5B:
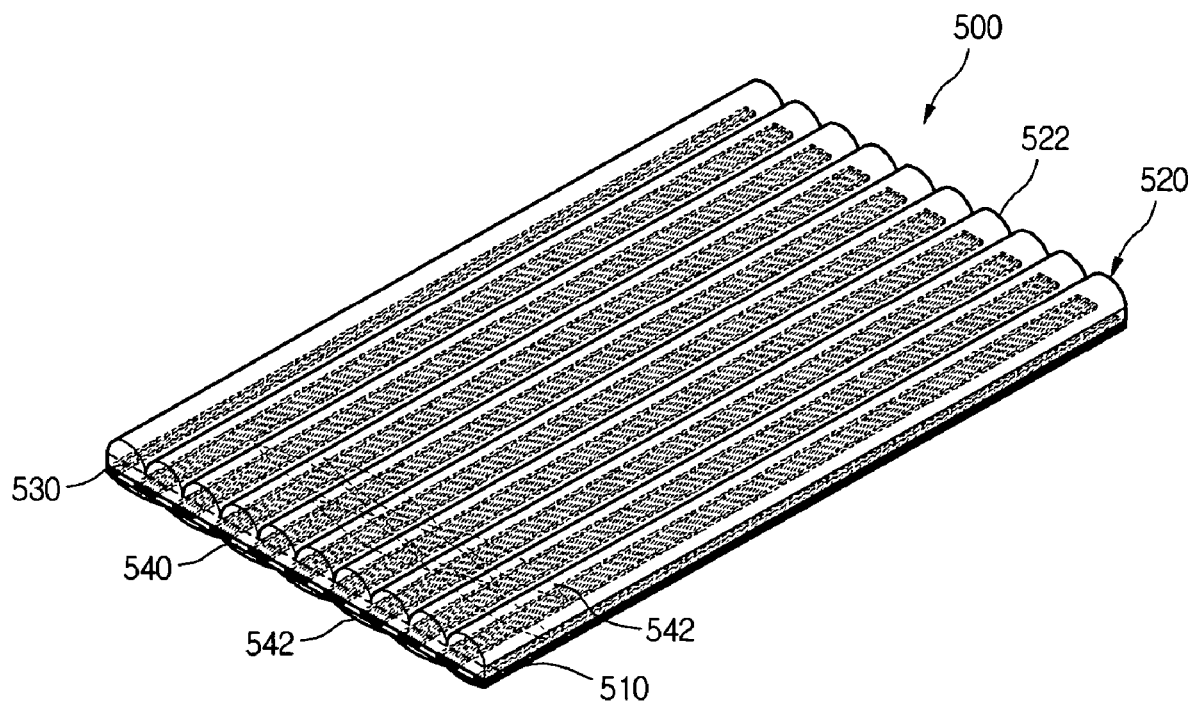

FIGS. 5A and 5B are a sectional view and a perspective view of a semicircular lens array sheet according to an embodiment of the present invention.

Referring to FIGS. 5A and 5B, a semicircular lens array sheet 500 of the present invention includes: a substrate 510; a semicircular lens array 520 disposed on the upper surface of the substrate 510 to allow light to progress on a constant optical path; a reflection pattern 530 formed on the substrate 510 to prevent light from being incident to a region (i.e., a valley B) where semicircular lenses 522 contact each other; and a diffuser film 540 having a plurality of protrusions 542 arranged in a direction perpendicular to the arrangement direction of the semicircular lens array 520.

The reflection pattern 530 is provided to prevent light side-lobes when light passes through a diffuser sheet (not shown) provided on the lower surface of the semicircular lens array sheet 500. The reflection pattern 530 is formed on the upper portion or the lower portion of the substrate 510 that corresponds to a contact region (i.e., a valley B) between the semicircular lenses 522. That is, the reflection pattern 530 may be formed on the lower surface of the substrate 510 as in the semicircular lens array sheet 300 illustrated in FIG. 3A but may also be formed on the upper surface of the substrate 510. In that case, the reflection pattern 530 may be formed in the same plane as that of the semicircular lens array 520.

Each of the protrusions 542 provided on the diffuser film 540 has a rounded shape protruded to the outside in the lower direction. Each of the semicircular lenses 522 provided to the semicircular lens array 520 has a rounded shape protruded to the outside but in the upper direction.

The semicircular lens array 520 includes a plurality of semicircular lenses 522 each having a stripe shape. The semicircular lenses 522 are arranged to contact each other. Therefore, light must pass through at least one of the semicircular lenses 522.

When the reflection pattern 530 is disposed on the substrate 510, the reflection pattern 530 is disposed first and then the semicircular lens array 520 is disposed.

Because the diffuser film 540 including the protrusions 542 is formed on the lower surface of the substrate 510, the reflection pattern 530 may be omitted. That is, because each of the protrusions 542 provided on the diffuser film 540 protrudes in a round shape toward a lower direction and is elongated in a direction perpendicular to the arrangement direction of the semicircular lenses 522, almost all of light incident to the protrusions 542 of the diffuser film 540 is incident to the semicircular lenses 522 and is not incident to the valley B between the semicircular lenses 522. Therefore, the reflection pattern 530 may not be required.

The diffuser film 540 includes the plurality of protrusions 542 arranged in a direction perpendicular to the direction of the semicircular lenses 520.

Each of the protrusions 542 has an elongated stripe shape and may be rounded and may be formed at random in a direction perpendicular to the arrangement direction of the semicircular lens array 520. It is possible to solve the asymmetry of the viewing angle resulting from the semicircular lens array 520 by having most of light incident to the semicircular lenses 522 using the protrusions 542 provided to the diffuser film 540.

According to the above-described semicircular lens array sheet 500, incident light is changed into light perpendicular to the LC panel using the semicircular lens array sheet 500 and the diffuser film 540. Therefore, it is possible to overcome the problem (generated in the related art prism sheet) where light incident to the inclined plane of the prism sheet is lost, not contributing to the front brightness due to the total internal reflection, and the problem (generated in the related art semicircular lens array sheet described with reference to FIGS. 3 and 4) that the viewing angle is asymmetric.

Figure 6:
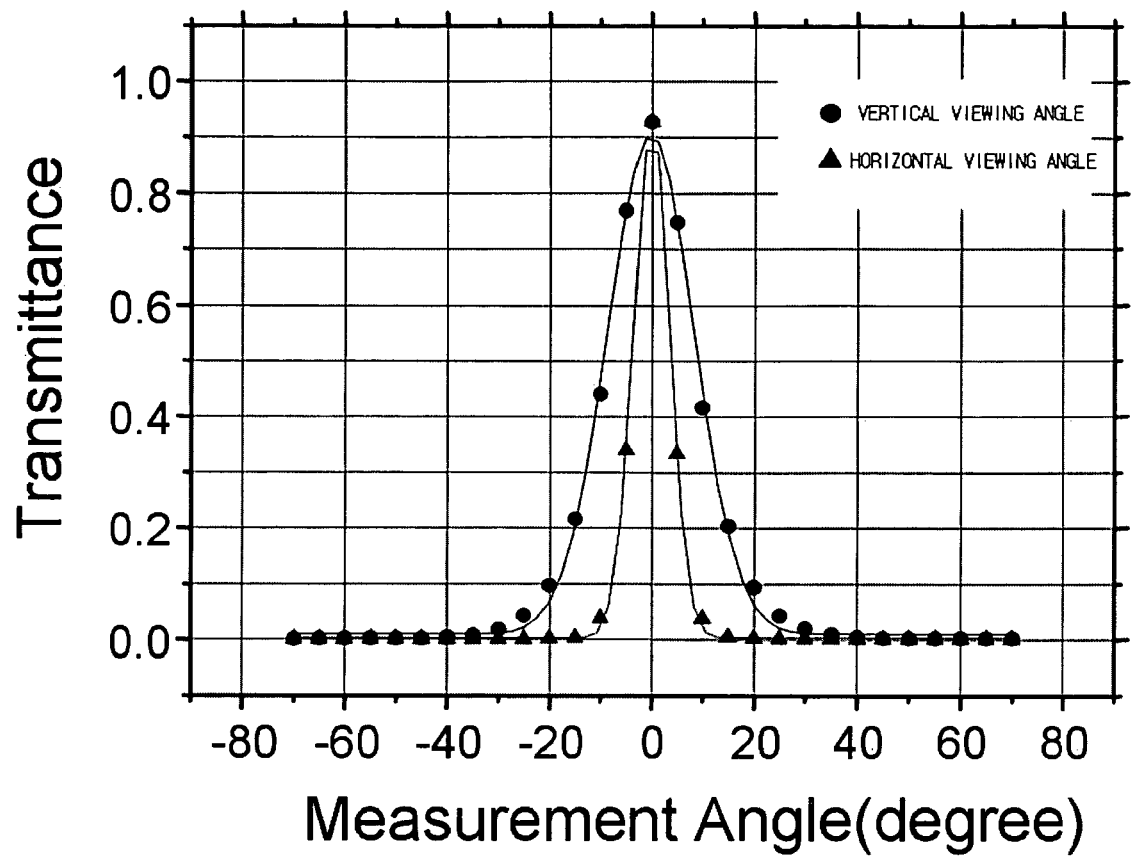
FIG. 6 is a graph illustrating the viewing angle characteristics of the white light of the diffuser film illustrated in FIGS. 5A and 5B.

FIG. 6 is a graph illustrating the viewing angle characteristics of the diffuser film for white light illustrated in FIGS. 5A and 5B.

Referring to FIG. 6, the viewing angle characteristics in vertical and horizontal directions by the diffusion film 540 are asymmetric like those of the semicircular lens array 520 illustrated in FIG. 4. However, the diffuser film 540 has asymmetric characteristics opposite to those of the semicircular lens array 520. That is, unlike the semicircular lens array 520, the diffuser film 540 has a vertical viewing angle wider than a horizontal viewing angle.

Accordingly, the narrow vertical viewing angle of the semicircular lens array 520 can be compensated for by the wide vertical viewing angle of the diffuser film 540. It is possible to complement the related art asymmetric viewing angle characteristics by combining the asymmetric viewing angle characteristics of the diffuser film 540 and the asymmetric viewing angle characteristics of the semicircular lens array 520, that is, by arranging the protrusions of the diffuser film 540 in a direction perpendicular to the arrangement direction of the semicircular lenses 522 of the semicircular lens array 520.

Figure 7:
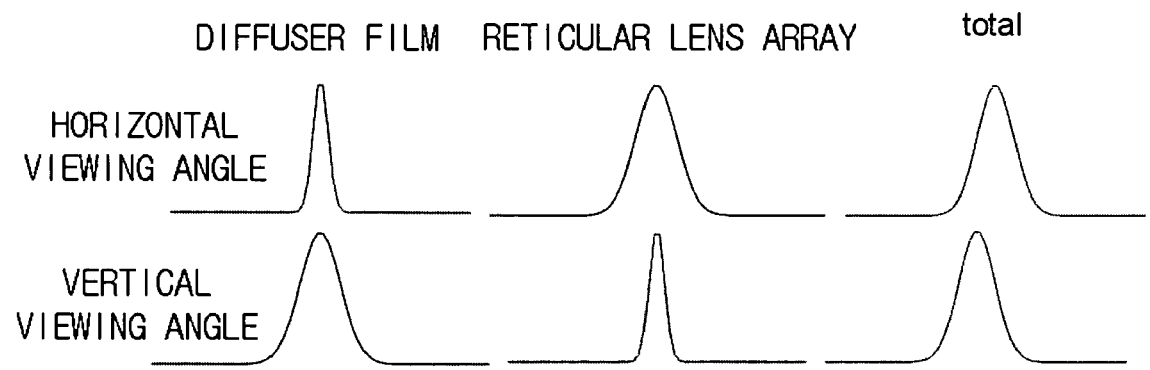
FIG. 7 is a view explaining a viewing angle compensation principle according to the present invention.

FIG. 7 is a view explaining a viewing angle compensation principle according to the present invention.

Referring to FIG. 7, the diffusion film 540 has a narrow horizontal viewing angle but the semicircular lens array 520 has a wide horizontal viewing angle.

Also, the diffusion film 540 has a wide vertical viewing angle but the semicircular lens array 520 has a narrow vertical viewing angle.

Therefore, when the diffusion film 540 and the semicircular lens array 520 are arranged perpendicularly to each other, the narrow horizontal viewing angle of the diffuser film 540 is compensated for by the wide horizontal viewing angle of the semicircular lens array 520. Also, the narrow vertical viewing angle of the semicircular lens array 520 is compensated for by the wide vertical viewing angle of the diffuser film 540. As a result, light that has passed through the diffuser film 540 and the semicircular lens array 520 has symmetric viewing angle characteristics.

Figure 8:
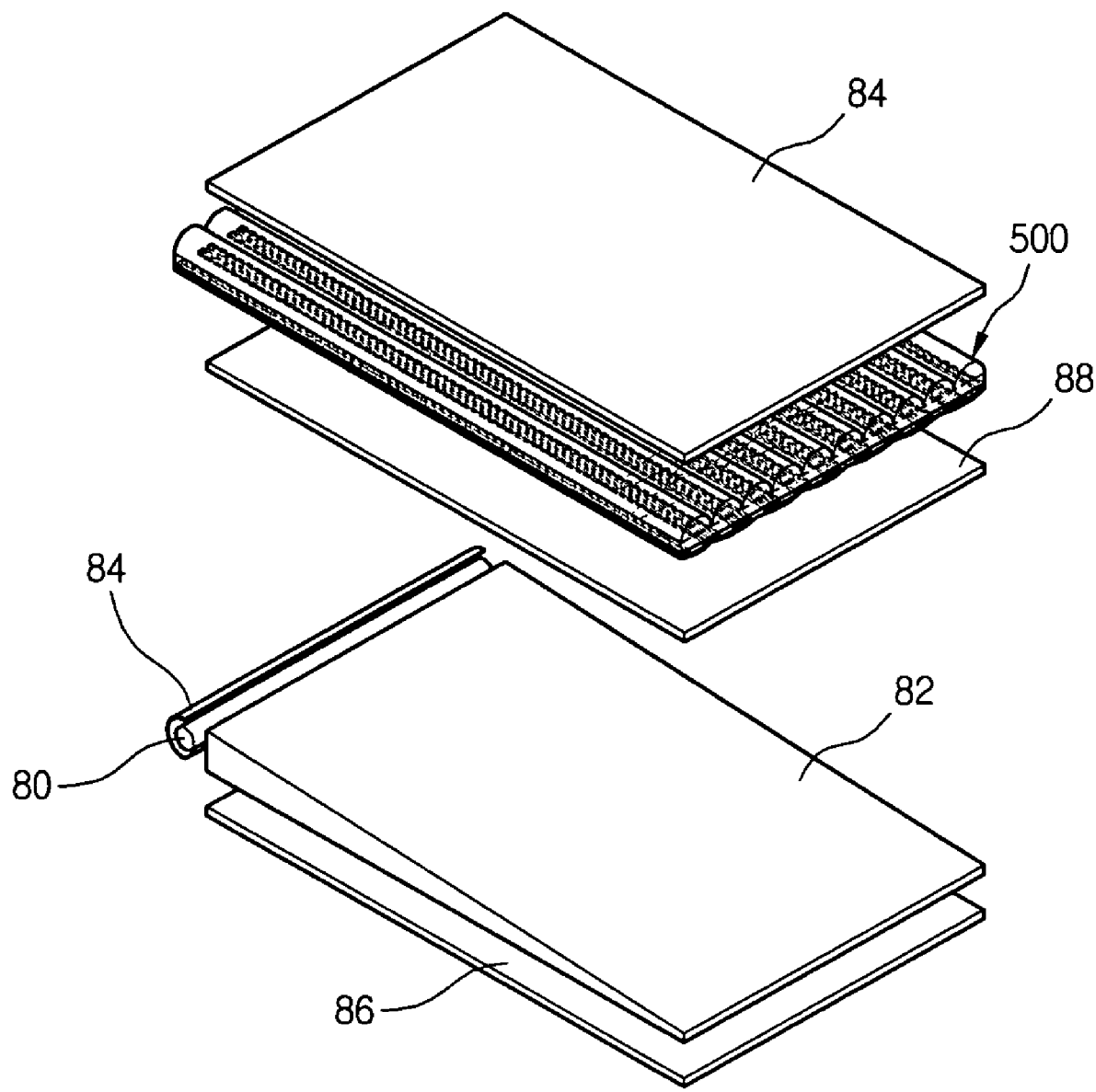
FIG. 8 is a view of a backlight unit including the semicircular lens array sheet illustrated in FIGS. 5A and 5B.

FIG. 8 is a view of a backlight unit including the semicircular lens array sheet illustrated in FIGS. 5A and 5B.

An edge-type backlight unit including the semicircular lens array sheet illustrated in FIGS. 5A through 7 will be described below as an example, the semicircular lens array sheet according to an embodiment of the present invention may be readily applied to a direct-type backlight unit.

Referring to FIG. 8, the backlight unit includes: a lamp 80 disposed on a side of the backlight unit to generate light; a lamp housing 84 to enclose the lamp 80; a light guide plate 82 for changing light incident from the lamp 80 in a lateral direction into a surface light source emitting from the surface of the backlight unit; a reflector 86 on the lower surface of the light guide plate 82 to reflect the light in a front direction; a diffuser sheet 88 on the upper surface of the light guide plate 82 to diffuse the light; and a semicircular lens array sheet 500 on the diffuser sheet 88. Also, the semicircular lens array sheet 500 causes the light to have a symmetric viewing angle and causes the light diffused by the diffuser sheet 88 to progress in a direction perpendicular to an LC panel (not shown).

A protection film 84 is on the upper surface of the semicircular lens array sheet 500 to protect the surface of the semicircular lens array sheet 500. The protection film 84 also makes the distribution of the light uniform.

The semicircular lens array sheet 500 changes incident light into light perpendicular to the LC panel using the semicircular lens array 520 and the diffuser film 540, thereby solving the problem (generated in the related art prism sheet) that light incident to the inclined plane of the prism sheet is lost, not contributing to the brightness of the backlight unit due to total internal reflection and the problem (generated in the related art semicircular lens array sheet described with reference to FIGS. 3 and 4) that the viewing angle is asymmetric.

Though the diffuser sheet 88 is included in the backlight unit in FIG. 8, the diffuser film 540 is formed on the lower surface of the substrate 510 of the semicircular lens array sheet 500, so that the diffuser sheet 88 may be omitted that may reduce the thickness of the optical sheet in the backlight unit of an LCD.

As described above, the present invention has the diffuser film including a plurality of protrusions arranged in a direction perpendicular to the arrangement direction of the semicircular lens array on the lower surface of the semicircular lens array sheet, thereby achieving symmetric vertical and horizontal viewing angle characteristics with respect to light incident to the LC panel of the front side.

Also, according to the present invention, the diffuser film and the semicircular lens array are incorporated into a single structure, so that the thickness of the optical sheet may be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A optical sheet comprising:
   a substrate;
   a plurality of reflection patterns on the substrate;
   a lens array having a plurality of elongated lenses arranged in a first direction on an upper surface of the substrate, each lens partially overlapping each reflection pattern, the lenses having valley portions that contact between the lenses and that contact the reflection patterns, the lenses being arranged in a stripe shape to the first direction, and each lens having a round shape; and
   a diffuser film on a lower surface of the substrate and having a plurality of protrusion patterns, the protrusions patterns being arranged in accordance with a second direction perpendicular to the first direction, being randomly formed on a lower surface of the diffuser film and having a round shape.

2. The optical sheet according to claim 1, wherein asymmetric viewing angle profile of the lens array is compensated by the diffuser film.

3. The optical sheet according to claim 1, wherein light is incident into the inside of the lenses, but not valleys formed between the lenses.

4. A backlight unit comprising:
   a lamp disposed on a lateral side;
   a light guide plate disposed in the same plane as that of the lamp to change light from the lamp into a surface light source; and
   an optical sheet disposed on an upper surface of the light guide plate to compensate a viewing angle of the light,
   wherein the optical sheet includes:
   a substrate;
   a pluraltiy of reflection patterns on the substrate;
   a lens array having a plurality of lenses arranged in a first direction on an upper surface of the substrate, each lens partially overlapping each reflection pattern, the lenses having valley portions that contact between the lenses and that contact the reflection patterns, the lenses being arranged in a stripe shape to the first direction, and each lens having a round shape; and
   a diffuser film on a lower surface of the substrate and having a plurality of protrusion patterns, the protrusions patterns being arranged in accordance with a second direction perpendicular to the first direction, being randomly formed on a lower surface of the diffuser film and having a round shape.

5. The backlight unit according to claim 4, further comprising a reflector disposed on a lower surface of the light guide plate to reflect the light.

6. The backlight unit according to claim 4, wherein asymmetric viewing angle profile of the lens array is compensated by the diffuser film.

7. A backlight unit comprising:
   a plurality of lamps arranged in the same plane; and
   an optical sheet disposed on the lamps to compensate a viewing angle of the light,
   wherein the optical sheet includes:
   a substrate;
   a plurality of reflection patterns on the substrate;
   a lens array having a plurality of lenses arranged in a first direction on an upper surface of the substrate, each lens partially overlapping each reflection pattern, the lenses having valley portions that contact between the lenses and that contact the reflection patterns, the lenses being arranged in a stripe shape to the first direction, and each lens having a round shape; and
   a diffuser film on a lower surface of the substrate and having a plurality of protrusion patterns, the protrusions patterns being arranged in accordance with a second direction perpendicular to the first direction, being randomly formed on a lower surface of the diffuser film and having a round shape.

8. The backlight unit according to claim 7, further comprising a reflector disposed on a lower surface of the light guide plate to reflect the light.

9. The backlight unit according to claim 7, wherein asymmetric viewing angle profile of the lens array is compensated by the diffuser film.

* * * * *